(12) United States Patent
Shah

(10) Patent No.: US 9,869,028 B2
(45) Date of Patent: Jan. 16, 2018

(54) SIDE STREAM REMOVAL OF IMPURITIES IN ELECTROLYSIS SYSTEMS

(71) Applicant: Chemetics Inc., Vancouver (CA)

(72) Inventor: Amit Shah, Burnaby (CA)

(73) Assignee: Chemetics Inc., Vancouver (CA)

( * ) Notice: Subject to any disclaimer, the term of this patent is extended or adjusted under 35 U.S.C. 154(b) by 138 days.

(21) Appl. No.: 14/422,898

(22) PCT Filed: Aug. 20, 2013

(86) PCT No.: PCT/CA2013/050643
§ 371 (c)(1),
(2) Date: Feb. 20, 2015

(87) PCT Pub. No.: WO2014/029021
PCT Pub. Date: Feb. 27, 2014

(65) Prior Publication Data
US 2015/0247249 A1    Sep. 3, 2015

Related U.S. Application Data

(60) Provisional application No. 61/692,229, filed on Aug. 22, 2012.

(51) Int. Cl.
| | |
|---|---|
| C25B 1/28 | (2006.01) |
| C25B 1/34 | (2006.01) |
| C25B 9/06 | (2006.01) |
| C25B 15/08 | (2006.01) |
| C01D 3/16 | (2006.01) |

(Continued)

(52) U.S. Cl.
CPC ............ C25B 15/08 (2013.01); C01D 3/16 (2013.01); C01F 7/34 (2013.01); C25B 1/265 (2013.01); C25B 1/34 (2013.01); C25B 9/06 (2013.01)

(58) Field of Classification Search
CPC .. C25B 1/26; C25B 1/265; C25B 1/34; C25B 1/35; C25B 9/06; C25B 15/08; C01D 3/16; C01F 7/34
See application file for complete search history.

(56) References Cited

U.S. PATENT DOCUMENTS

| | | |
|---|---|---|
| 3,286,992 A | 11/1966 | Armeniades et al. |
| 4,036,714 A | 7/1977 | Spitzer |
| 4,073,706 A | 2/1978 | Nagy |

(Continued)

FOREIGN PATENT DOCUMENTS

| | | |
|---|---|---|
| CA | 2129280 | 2/1995 |
| EP | 175524 A2 | 3/1986 |

OTHER PUBLICATIONS

International Search Report for Application No. PCT/CA2013/050643, dated Oct. 16, 2013, 3 pages.

(Continued)

*Primary Examiner* — Ciel P Thomas
(74) *Attorney, Agent, or Firm* — Seed IP Law Group LLP

(57) ABSTRACT

A side stream subsystem can be used to remove impurity species from the recirculating alkali metal chloride solution in certain electrolysis systems. Silicon and/or aluminum species can be removed via precipitation after introducing an alkali metal hydroxide and magnesium chloride in a side stream line in the subsystem. The invention can allow for a substantial reduction in raw material and capital costs.

11 Claims, 3 Drawing Sheets

(51) Int. Cl.
C01F 7/34 (2006.01)
C25B 1/26 (2006.01)

(56) References Cited

U.S. PATENT DOCUMENTS

| | | | |
|---|---|---|---|
| 4,274,929 | A | 6/1981 | Novak |
| 4,702,805 | A | 10/1987 | Burkell et al. |
| 5,093,089 | A | 3/1992 | Alford et al. |
| 5,215,632 | A | 6/1993 | Fritts et al. |
| 5,482,696 | A | 1/1996 | Hönigschmid-Grossich et al. |
| 6,471,871 | B1 * | 10/2002 | Pitzer .................. C02F 1/5236 205/502 |
| 6,746,592 | B1 | 6/2004 | Mok et al. |

OTHER PUBLICATIONS

Albchem Industries Ltd., "Standard Operating Procedures No. 16: Sulfate Treatment," Hargrave Plant, May 12, 2003, 5 pages.

Albchem Virden Manitoba, "Hargrave Krebs process CaC12/MgC12 blend solution distribution and sulphate removal flow diagrams including mass balance table," Schematic, 2 pages.

Balfour, "ERCO Worldwide Hargrave—Environment Act License No. 2495 R5 Notice of Alteration," Letter to Tracey Braun, M.Sc., Director, Environmental Approvals, Manitoba Conservation and Water Stewardship (MCWS), Winnipeg, Canada, Jan. 8, 2014, 3 pages.

Burney et al. (eds.), *Chlor-Alkali and Chlorate Technology: R.B. MacMullin Memorial Symposium*, Proceedings vol. 99-21, The Electrochemical Society, Pennington, New Jersey, USA, 1999, pp. 19-21. (4 pages).

Colman et al., "Sodium Chlorate," in McKetta et al. (eds.), *Encyclopedia of Chemical Processing and Design*, Marcel Dekker, Inc., New York, New York, USA, 1995, Chapter 51, "Slurry Systems, Instrumentation to Sad-Liquid Separation," p. 141. (2 pages).

Gerhartz et al. (eds.), *Ullmann's Encyclopedia of Industrial Chemistry*, 5th ed., vol. A6, VCH, Weinheim, Germany, 1996/1997, p. 407. (2 pages).

Kishi et al., "Process to Remove Sulphate, Iodide and Silica from Brine," in Moorhouse (ed), *Modern Chlor-Alkali Technology vol. 8*, Blackwell Science, Hollingwood, United Kingdom, 2000, pp. 152 and 154. (3 pages).

Maycock et al., "A New Method to Remove Sodium Sulphate from Brine," in Sealey (ed.), *Modern Chlor-Alkali Technology vol. 7*, The Royal Society of Chemistry, Ellesmere Port, United Kingdom, 1998, p. 219. (3 pages).

Moser, "Control of Sulphate in the Production of Crystal Sodium Chlorate," in Prout et al. (eds.), *Modern Chlor-Alkali Technology vol. 4*, Elsevier Applied Science, London, United Kingdom, 1990, pp. 326-329. (4 pages).

Saiki et al, "New Desulfation System for Chlor-alkali Plant," in Curry (ed.), *Modern Chlor-Alkali Technology vol. 6*, The Royal Society of Chemistry, Runcom, United Kingdom, 1995, p. 85, (3 pages).

Ward Chemical Inc., Shipment documents of 'V' Grade Brine 1.35 (Calcium chloride/Magnesium chloride blend solution) and Certificate of Analysis, Villeneuve, Alberta, to Edmonton, Alberta, Feb. 17, 2012, 4 pages.

* cited by examiner

SIDE STREAM REMOVAL OF IMPURITIES IN ELECTROLYSIS SYSTEMS

TECHNICAL FIELD

The present invention pertains to apparatus and methods for removing impurities in industrial electrolysis systems. In particular, it pertains to removal of silicon and/or aluminum species in side streams in chlor-alkali and chlorate electrolysis systems.

BACKGROUND

Industrial electrolysis systems in which brines of various kinds are subjected to electrolysis in order to produce other useful chemical products have been operating on a large scale for decades. In particular, chlor-alkali and chlorate electrolysis systems have been used to provide much of the chlorine, sodium hydroxide, and chlorate products which are subsequently used to prepare other chemicals or used in the manufacture of various other products.

As a consequence of increasing environmental concerns coupled with a highly competitive marketplace, modern chlor-alkali and chlorate producers are forced to look for alternative ways to minimize the amount of solid and liquid effluent produced as well as ways to reduce operating and capital costs.

A current strategy for reducing the amount of effluent is to use evaporated salt as a source of raw material to make-up the brine to be electrolyzed instead of the solar or rock salt typically used in the past. Evaporated salt is a much purer and cleaner source of salt and typically has amounts of alkali earth metal and other heavy metal contaminants that are orders of magnitude lower in concentration. Upon dissolution of this purer salt, the resulting brine solution quality is such that the conventional primary treatment process for the brine in such electrolysis systems can be eliminated.

In chlor-alkali systems, a supply of brine at an appropriate concentration is supplied to an electrolyzer where it is partially electrolyzed. Weak spent brine from the electrolyzer is then supplemented with additional make-up salt in a saturator and is then recycled back as brine supply for the electrolyzer. However, the conventional secondary treatment process for the brine in such systems uses a purification subsystem comprising cationic chelating resins, which are not effective in removing certain impurity species such as aluminum and silica. Historically, such impurity species were removed with the purge of sludges associated with the conventional primary treatment process. Thus, with the elimination of this primary treatment process, the aluminum and silica impurity species are not effectively removed by the secondary treatment process and consequently they can accumulate in the recycling brine circuit as make-up salt is continually added thereto.

These accumulating aluminum and silicon species impurities may be removed by continuously purging an amount of brine from the recycling brine in the main recirculation line in the system. The required amount of purge may vary from about 5 to 30% of the flow rate of the brine in the main recirculation line depending upon the purity of the supply of evaporated salt. However, the loss of salt associated with purging is generally not considered economical. Thus instead, such impurities are typically removed by treating the full flow of brine in the recirculation line.

Methods are disclosed in the art for removing aluminum and silicon species in brine streams. For instance, U.S. Pat. No. 4,073,706 teaches a process for the removal of trace metals from alkali halide brines. The addition of controlled amounts of magnesium ions to brine and subsequent precipitation of magnesium hydroxide removes metal contaminants, and provides a brine suitable for use in the electrolytic production of chlorine and alkali metal hydroxide. In the process, the pH can be adjusted by the addition of NaOH.

Also for example, U.S. Pat. No. 6,746,592 discloses a method for the reduction of soluble aluminum species in an evaporated salt alkali metal halide brine to provide a brine feedstock suitable for use in a chlor-alkali membrane cell process. The method comprising treating the brine with a suitable amount of magnesium salt and sufficient alkali metal hydroxide to provide an excess alkalinity concentration to effect precipitation of a magnesium aluminum hydroxide complex.

Further, U.S. Pat. No. 4,274,929 teaches a process for the removal of silicates in alkali metal choride containing industrial waste streams to provide waste brine streams suitable for use in the electrolytic production of chlorine and alkali using a diaphragm electrolytic cell. The process involves adding a soluble magnesium compound to alkali metal chloride solution and precipitating the silicates as compounds of magnesium. The process includes adjusting the pH of the alkali metal chloride solution to about 11.5 by adding sodium hydroxide, sodium carbonate, or mixtures thereof to render the magnesium silicates insoluble in the solution.

Although methods such as the above involving magnesium addition and precipitation are effective in removing aluminum and silicon species, the high levels required for silicon species removal result in poor filtration. And, much more expensive filteraid in the filtering subsystems must be used for reasonable filter cycle times. And while such methods have been used in the art to purify brine streams for or in chlor-alkali electrolysis systems, such methods do not appear to have been suggested for use in side streams in such systems. Instead, the methods are used or suggested for use in a main line or recirculation line for the brine streams. Further, such methods do not seem employed in chlorate electrolysis systems.

Despite the maturity and sophistication of modern electrolysis systems, there remains a continuing need for reduction of effluent and for reduction in operating and capital costs. The present invention addresses these and other needs as discussed below.

SUMMARY

The present invention includes systems and methods for purifying alkali metal solution in an electrolysis system and particularly for removing silicon species and also aluminum species from the solution.

More specifically, the electrolysis system is for electrolyzing an alkali metal chloride brine (e.g. sodium chloride brine) and comprises an electrolyzer, a main line, a recirculation line, and a side stream subsystem. The main line comprises a main stream of purified brine, the electrolyzer, and a main stream of spent solution in which the main stream of purified brine is supplied to the inlet of the electrolyzer and the main stream of spent solution is removed from the outlet of the electrolyzer. The recirculation line is connected to the main line and recirculates at least a portion of the solution from the main line.

The side stream subsystem comprises a first side stream line with an inlet and an outlet connected to the recirculation line and is configured to remove a portion of the solution from the recirculation line at the inlet and return the portion to the recirculation line at the outlet. In addition, the side stream subsystem comprises a feed for introducing alkali metal hydroxide into the first side stream line, a first feed for introducing magnesium chloride into the first side stream line, a residence tank in the first side stream line downstream of the alkali metal hydroxide and the magnesium chloride feeds, and a filter in the first side stream line downstream of the residence tank for removing precipitated impurity species. Employing the side stream subsystem of the invention can allow for a substantial reduction in raw material and capital costs.

In an embodiment particularly suitable for removing both silicon and aluminum species, the electrolysis system comprises a second side stream line. For example, the first magnesium chloride feed in the electrolysis system can be located downstream of the alkali metal hydroxide feed in the first side stream line. And in addition, the side stream subsystem comprises a second side stream line and a second feed for introducing magnesium chloride into the second side stream line. The inlet of the second side stream line is connected to the first side stream line between the alkali metal hydroxide feed and the first magnesium chloride feed, and the outlet of the second side stream line is connected to the first side stream line between the residence tank and the filter. Thus, in this arrangement, the second side stream line bypasses the residence tank. The side stream subsystem in this embodiment can further comprise a mixing tank between the residence tank and the filter and the outlet of the second side stream line can be connected to the mixing tank.

In all the preceding embodiments, the side stream subsystems can comprise static mixers downstream of each of the alkali metal hydroxide, the first magnesium chloride, and the second magnesium chloride feeds.

The invention can be employed in a chlor-alkali electrolysis system in which the electrolyzer is a chlor-alkali electrolyzer, and the recirculation line is the main line and recirculates the solution in the main line from the outlet to the inlet of the chlor-alkali electrolyzer. Such a chlor-alkali electrolysis system can comprise one or more purification subsystems in the recirculation line for purifying the solution, and one or more make-up subsystems in the recirculation line for introducing additional alkali metal chloride and water into the solution.

In a suitable embodiment of a chlor-alkali electrolysis system, the first side stream line can be configured to remove less than about 50% and/or more than about 5% of the solution in the recirculation line. Further, the alkali metal hydroxide and the first magnesium chloride feeds can be introduced into the first side stream line at the same or different locations.

The invention can also be employed in a chlorate electrolysis system in which the electrolyzer is a chlorate electrolyzer, and the system comprises a chlorate reactor in the main line to further react electrolyzed chlorate solution from the chlorate electrolyzer to more concentrated chlorate solution, and a chlorate crystallization subsystem in the main line downstream of the chlorate reactor for crystallizing chlorate from the more concentrated chlorate solution. In the chlorate electrolysis system, the recirculation line recirculates chlorate solution from the crystallization subsystem to the chlorate reactor.

In a related method, impurity species are removed from an alkali metal solution in an electrolysis system comprising an electrolyzer, a main line, and a recirculation line. The method steps include:
removing a portion of the solution from the recirculation line into a first side stream,
introducing alkali metal hydroxide into the first side stream,
introducing magnesium chloride into the first side stream,
directing the first side stream to a residence tank after introducing the alkali metal hydroxide and the magnesium chloride,
allowing the first side stream to reside in the residence tank for a period of time (e.g. less than about 300 minutes and particularly between about 60 and 120 minutes),
filtering the first side stream after residing in the residence tank, and
returning the solution portion from the first side stream into the recirculation line.

As mentioned previously, in some embodiments a second side stream can be advantageously employed. The method steps can then additionally include:
introducing alkali metal hydroxide into the first side stream before introducing the magnesium chloride into the first side stream,
removing a side stream portion of the solution from the first side stream into the second side stream after introducing the alkali metal hydroxide,
introducing magnesium chloride into the second side stream, and
returning the side stream portion from the second side stream into the first side stream.

In this way, the side stream portion of the solution bypasses the residence tank.

The method is suitable for both chlor-alkali electrolysis systems and for chlorate electrolysis systems.

DETAILED DESCRIPTION

Unless the context requires otherwise, throughout this specification and claims, the words "comprise", "comprising" and the like are to be construed in an open, inclusive sense. The words "a", "an", and the like are to be considered as meaning at least one and not limited to just one.

In addition, the following definition is intended. In a numerical context, the word "about" is to be construed as meaning plus or minus 10%.

The present invention represents an improved process and apparatus for removing silicon and aluminum species impurities from alkali metal solution, especially in electrolysis systems in which the brine is prepared using purer sources of salt, e.g. evaporated salt.

In the process, brine is treated with magnesium chloride and an alkali metal hydroxide (e.g. sodium hydroxide) such that a suitable magnesium concentration and alkalinity in the resulting brine is obtained. This causes the silicon and aluminum species in the brine to form complexes with the magnesium, which precipitate out of solution and can then be removed by filtration. Appropriate values for the magnesium concentration and alkalinity are disclosed in the aforementioned prior art that are suitable for both silicon and aluminum species removal (e.g. Mg concentration between about 20 to 60 ppm and sufficient alkali metal hydroxide to provide an excess alkalinity concentration of between 0.05-0.1 g/L alkali metal hydroxide). For effective removal of silicon species, a significant residence time for the treated brine is required (e.g. 60 to 120 minutes) in order to fully accomplish complexing and precipitation. On the other hand, effective removal of aluminum species can be accomplished without a significant residence time requirement for the treated brine.

While conventional electrolysis systems may employ related treatment processes in a main brine line or main recirculation line, in the present improved system, treatment is carried out in a side stream connected to a recirculation line. In this way, satisfactory removal of these impurities can be achieved with lower operating and capital costs.

Figure 1:
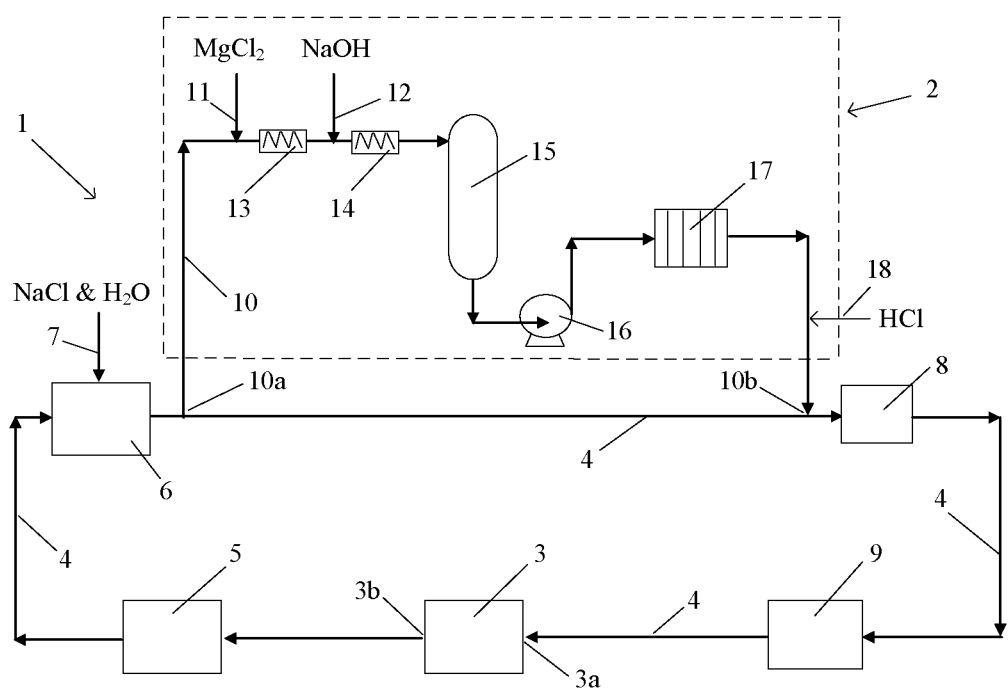
FIG. 1 shows a schematic view of a chlor-alkali electrolysis system comprising a first side stream line for the removal of silicon and aluminum species in accordance with the invention.

FIG. 1 shows a schematic view of a chlor-alkali electrolysis system comprising a first side stream line for the removal of both silicon and aluminum species in accordance with the invention. Chlor-alkali electrolysis system 1 comprises many of the components and subsystems, in similar configuration, to those found in conventional chlor-alkali electrolysis systems. The main line in system 1 is itself a recirculation line and comprises membrane electrolyzer 3, dechlorination subsystem 5, brine saturator 6, guard filter 8, and ion exchange subsystem 9 which are interconnected in a loop as shown. In addition though, system 1 comprises side stream subsystem 2 (indicated by the dashed box in FIG. 1). Specifically, system 1 includes membrane electrolyzer 3 having inlet 3a and outlet 3b. A stream of purified brine is supplied to electrolyzer inlet 3a from main line/recirculation line 4. A stream of spent brine is removed from electrolyzer outlet 3b to main line/recirculation line 4. Following electrolysis the spent brine is directed to dechlorination subsystem 5, which is a purification subsystem for removing chlorine from the brine stream. Then, the brine stream is directed to brine saturator 6 where make-up sodium chloride and demineralized water or sodium chloride brine water is added at salt and water feed 7 (using evaporated salt as a source) to bring up the salt concentration in the stream to the desired level for electrolysis. A portion of the brine stream is then directed to guard filter 8 where solid particulates and precipitates are removed from the stream. From there, the brine is directed via main line/recirculation line 4 to a secondary purification subsystem comprising ion exchange subsystem 9 for ensuring very low hardness levels in the purified brine stream. Finally, purified brine from ion exchange subsystem 9 is again available as a supply for electrolyzer 3 thereby completing the recirculation of the brine.

Side stream subsystem 2 comprises side stream line 10 whose inlet 10a and outlet 10b are connected to main line/recirculation line 4. A portion or fraction of the brine stream in main line/recirculation line 4 is removed and directed into side stream line 10 at inlet 10a. The portion to be removed depends in part on the purity of the sodium chloride salt provided at salt and water feed 7 and in part on removal efficiency. Considering that the impurity removal efficiency using the envisaged treatment process is expected to be about 30 to 90% efficient, the portion of the brine stream in the main line/recirculation line to be removed would generally be about or slightly higher than the rate of purge which would be used if purging was employed to remove the accumulating impurities instead (namely expected to be about 5-50% of the brine in the recirculation line).

An amount of magnesium chloride salt appropriate for the impurity present in side stream 10 is then added at magnesium chloride feed 11. As shown in FIG. 1, the side stream is directed to static mixer 13 for mixing. Next, an appropriate amount of sodium hydroxide is added to adjust the alkalinity at sodium hydroxide feed 12. The side stream is then directed to another static mixer 14 for mixing. (Note: while FIG. 1 shows an initial addition of $MgCl_2$ followed by an addition of NaOH, the order of addition may be reversed or in fact both may be added simultaneously.) Afterwards the side stream is directed to residence tank 15 where it resides for less than 300 minutes, particularly about 60 to 120 minutes. During this time, magnesium complexes are formed and precipitate out of the brine solution. The side stream is then pumped through precoat filter 17 by pump 16 to remove solids. An amount of hydrochloric acid is added as required to readjust the side stream pH at hydrochloric acid feed 18. Finally, the treated side stream rejoins main line/recirculation line 4 and side stream outlet 10b.

In the embodiment of FIG. 1, both silicon and aluminum species present in the side stream are removed by this treatment. Because the amount of brine being treated in side stream line 10 is only a fraction of that which is conventionally treated in main line/recirculation line 4, the capital cost of the components in side stream subsystem 2 is much less than their conventional equivalents for treating in larger main line/recirculation line 4. Further, the consumption of raw materials such as magnesium chloride and sodium hydroxide is reduced considerably. And, the resulting solids (effluent cake) are also reduced as well.

While the electrolysis system of FIG. 1 typically employs evaporated salt as a source of make-up salt, it can also employ solar salt (or the like) which contains a relatively low amount of magnesium but high silica. Aluminum species can easily be removed from it but the silica present cannot be removed through conventional primary or secondary brine treatment.

Figure 2:
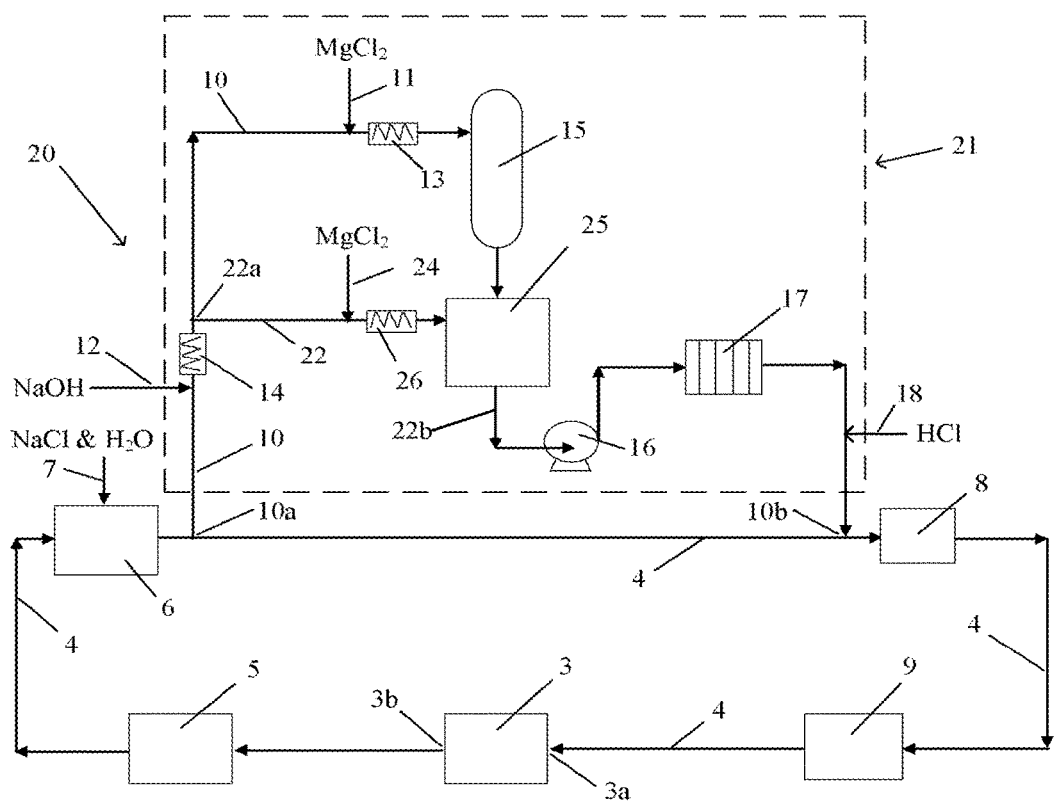
FIG. 2 shows a schematic view of a chlor-alkali electrolysis system comprising first and second side stream lines for the removal of silicon and aluminum species respectively in accordance with the invention.

FIG. 2 shows an alternative embodiment of a chlor-alkali electrolysis system of the invention comprising first and second side stream lines for the removal of silicon and aluminum species respectively. In FIG. 2, the components common to those in FIG. 1 have been identified with the same numerals. Here, electrolysis system 20 again comprises many components common to a conventional chlor-alkali electrolysis system, but in addition side stream subsystem 21 has been incorporated for removing impurities.

Side stream subsystem 21 again comprises first side stream line 10 which directs a first side stream to residence tank 15 after adding and mixing together appropriate amounts of supplied NaOH and $MgCl_2$. In addition however, side stream subsystem 21 includes second side stream line 22 which is connected to first side stream line 10 as shown. Inlet 22a is connected to line 10 between sodium hydroxide feed 12 and first magnesium chloride feed 11. Outlet 22b is connected to line 10 between residence tank 15 and precoat filter 17, and in particular is connected to mixing tank 25 located in line 10. A side stream portion of brine is directed from first side stream line 10 into second side stream line 22 and essentially bypasses residence tank 15. A second magnesium chloride feed 24 is provided to supply $MgCl_2$ to side stream line 22 and another static mixer 26 is provided for mixing thereafter.

In the embodiment of FIG. 2, second side stream line 22 is primarily for treating the brine to remove aluminum species since a substantial residence time is not required. And first side stream line 10 is primarily for treating the brine to remove silicon species. After treatment has been accomplished in both side stream lines, the treated brine streams are collected and mixed in mixing tank 25. The remaining components in side stream subsystem 21 are similar to those in subsystem 2 in FIG. 1.

The dual side stream configuration of FIG. 2 is advantageous because the aluminum concentration limit for brine supplied to the electrolyzer is much lower than the silicon concentration limit. Yet the aluminum species can be reacted, precipitated, and hence removed much more quickly than the silicon species. Thus, different flow rates can be employed in each stream and the amounts of $MgCl_2$ added at first and second feeds 11, 24 can be adjusted optimally for each function. Overall, the embodiment of FIG. 2 allows for less consumption of magnesium chloride and NaOH and results in less effluent cake discharge.

In operating the system shown in FIG. 2, silicon species impurities co-precipitated with the Mg hydroxide sludge could get re-dissolved if the excess NaOH in side stream line 22 is not properly controlled. To address this potential problem, control of excess NaOH in mixing tank 25 is suggested via appropriate flow ratio control of the NaOH added at feed 12 as shown in the FIG. 2, located upstream of second side stream inlet 22a. For instance, if the flow ratio is adjusted based on 0.1 g/L excess NaOH in mixing tank 25, then less than 0.1 g/L excess NaOH could always be maintained in first side stream 10 between inlet 22a and mixing tank 25 (for Si removal) and greater than 0.1 g/L excess NaOH could always be maintained in second side stream 22 (for Al removal).

Figure 3:
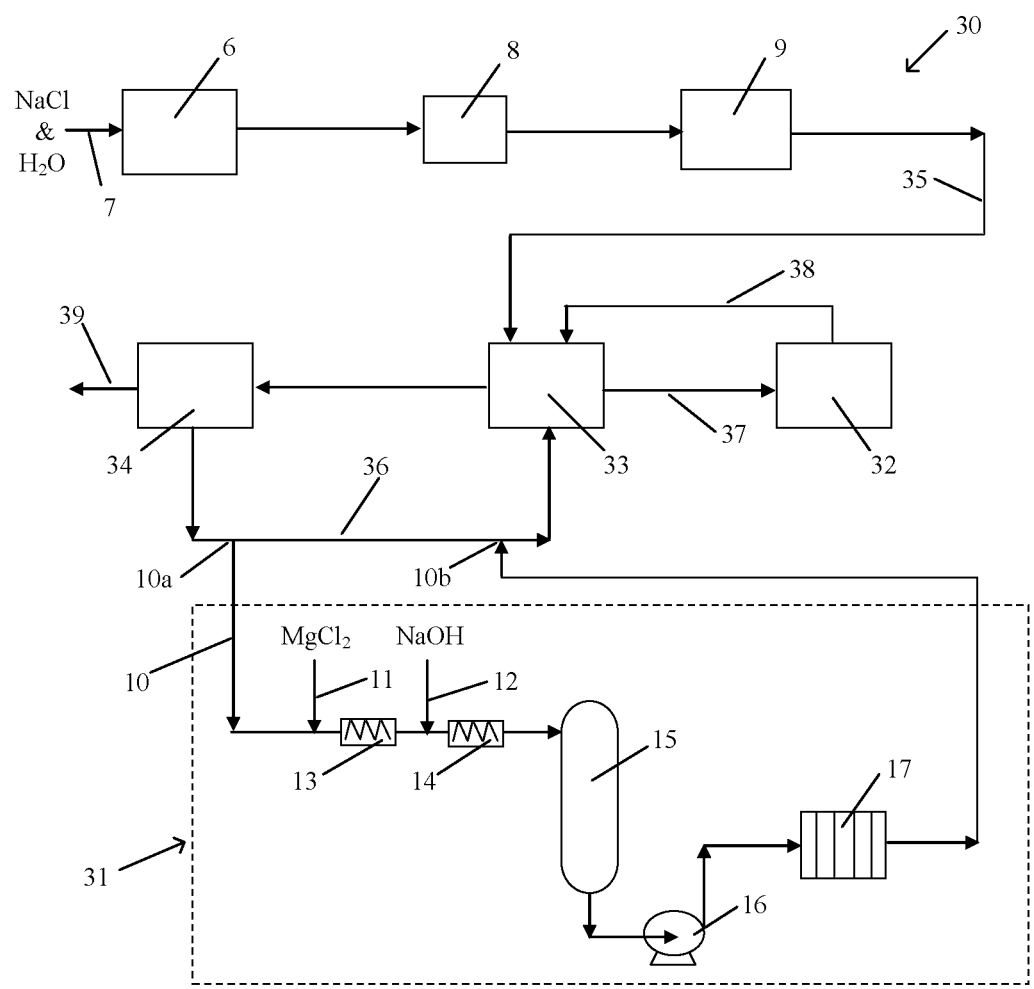
FIG. 3 shows a schematic view of a chlorate electrolysis system comprising a side stream subsystem mainly for the removal of silicon species in accordance with the invention.

FIG. 3 shows a schematic view of a chlorate electrolysis system comprising a side stream subsystem in accordance with the invention. Again, note that in FIG. 3, components similar in function to those in FIG. 1 have been identified with the same numerals. Many of the components and their configuration in chlorate electrolysis system 30 are similar to those found in conventional chlorate electrolysis systems. Here, the main line in system 30 is more complex and in sequence comprises salt and water feed 7, brine saturator 6, guard filter 8, ion exchange subsystem 9, brine line 35, chlorate reactor 33, line 37, chlorate electrolyzer 32, line 38, chlorate reactor 33 again, chlorate crystallization subsystem 34, and line 39 which are interconnected as shown. Brine for electrolysis is prepared in brine saturator 6. A suitable source of salt (e.g. evaporated salt) and a supply of demineralised water is provided at salt and water feed 7. From there, brine is directed via brine line 35 to guard filter 8, then to ion exchange subsystem 9 and finally to chlorate reactor 33 where it is mixed with the product from chlorate electrolyzer 32 to maintain the salt content in the electrolyzer feed. Chlorate reactor 33 directs an electrolyte solution for electrolysis comprising both chlorate and brine to chlorate electrolyzer 32 via line 37. And electrolyzed chlorate solution from chlorate electrolyzer 32 is directed back to chlorate reactor 33 via line 38.

Concentrated product chlorate solution from chlorate reactor 33 is directed to chlorate crystallization subsystem 34 where chlorate product is crystallized out from the more concentrated chlorate solution and removed at 39. The leftover solution after crystallizing is recirculated back to chlorate reactor 33 via recirculation line 36.

Over time, impurities can accumulate in recirculation line 36. To remove these, chlorate electrolysis system 30 has been provided with side stream subsystem 31 connected in parallel to recirculation line 36. Here, the side stream subsystem is primarily for removal of silica species but will also remove aluminum species. As shown in FIG. 3, a portion of solution is removed from recirculation line 36 at side stream line inlet 10a. The portion of solution is directed to side stream subsystem 31 for removing silica and aluminum impurity species (again, indicated by the dashed box). As shown in FIG. 3, the components and their configuration in side stream subsystem 31 can be similar to those in side stream subsystem 2 of FIG. 1. Alternatively, subsystem 31 may employ a configuration similar to that shown in FIG. 2.

As in the preceding chlor-alkali electrolysis system embodiments, subsystem 31 may serve to remove both silica and aluminum species. It is primarily expected to be used for silica removal however. The allowable limit for aluminum for chlorate electrolyzers is typically an order of magnitude higher than that for chlor-alkali electrolyzers. And if brine was prepared from evaporated salt, removal of aluminum may not be required. However, in the event that solar salt were employed, aluminum impurity can be precipitated and filtered out in the form of aluminum magnesium hydroxide complexes using conventional primary brine treatment.

Advantages of the invention include potential simplification of the electrolysis systems with a reduction in capital costs and operating costs. For instance, the conventional requirement for a precoat filter in the main brine stream may be eliminated. Instead a much smaller precoat filter may be employed in a side stream line and a guard filter in the main brine stream which reduces the consumption of costly cellulose and effluent cake discharge significantly. Further, a much smaller residence tank and pump may be employed. Further, use of the invention might be expected to provide for a reduction in consumption of magnesium chloride salt and sodium hydroxide (e.g. from 50 to 90% in a chlor-alkali electrolysis system when compared to conventional systems which treat the main brine stream). In addition, the HCl added to the filtered brine for pH control is reduced as a result of reducing the use of caustic.

The following Examples have been included to illustrate certain aspects of the invention but should not be construed as limiting in any way.

EXAMPLES

A series of experiments was conducted to determine exemplary removal results for silica and aluminum species from a typical brine solution as a function of temperature, residence time, and amounts of $MgCl_2$ and NaOH used.

In all the following, the test brine used was 25% w/w NaCl. Carbonates were first removed from the test brine by reducing the pH with HCl overnight and then returning the pH to neutral with NaOH. Then, aluminum and silica species were added (in the form of commercially available acidified standard solution) so as to bring the concentrations up to 0.1 mg/kg Al and 5 mg/kg $SiO_2$ respectively, which is typical for an evaporated salt brine solution.

For each test in the series, an amount of $MgCl_2$ was first added to a sample of test brine to obtain a desired concentration of Mg. Thereafter, an amount of NaOH was added to obtain a desired caustic concentration (expressed below as "excess NaOH" and which is in excess to that used to bring the sample to neutral pH prior to adding the aluminum and silica species). The sample was mixed and then allowed to react for a selected residence time. Finally, the sample contents were filtered using a ~1 micron syringe filter and the filtrate was analysed for residual aluminum and silica content.

In a first set of tests, results were determined at different temperatures (from 15 to 35° C.) and amounts of Mg added (from 10 to 40 mg/kg). The residence time used here was always 240 minutes. Table 1 shows the residual amounts of Al and $SiO_2$ in mg/kg and also expresses the latter in terms of % removed.

TABLE 1

Different temperature and Mg addition

| Mg added (mg/kg) | Excess NaOH (g/L) | Temp (° C.) | Final Al (mg/kg) | Final $SiO_2$ (mg/kg) | $SiO_2$ removed (%) |
|---|---|---|---|---|---|
| 10 | 0.088 | 15 | <0.01 | 4.55 | 9% |
| 10 | 0.088 | 25 | <0.01 | 4.10 | 18% |
| 10 | 0.088 | 35 | <0.01 | 3.65 | 27% |
| 20 | 0.098 | 15 | 0.02 | 3.70 | 26% |
| 20 | 0.098 | 23 | <0.01 | 3.27 | 35% |
| 20 | 0.098 | 35 | <0.01 | 3.00 | 40% |
| 40 | 0.107 | 15 | <0.01 | 2.78 | 44% |
| 40 | 0.104 | 25 | <0.01 | 2.20 | 56% |
| 40 | 0.109 | 35 | <0.01 | 1.80 | 64% |

In a second set of tests, results were determined at different residence times (from 60 to 240 minutes). Here, constant amounts of 40 mg/kg Mg and 0.1 g/L excess NaOH were added and a constant temperature of 60° C. was used. Table 2 again shows the residual amounts of Al and $SiO_2$ in mg/kg determined.

TABLE 2

Different residence time

| Residence time (minutes) | Final Al (mg/kg) | Final $SiO_2$ (mg/kg) | $SiO_2$ removed (%) |
|---|---|---|---|
| 60 | <0.01 | 4.00 | 20% |
| 120 | <0.01 | 3.00 | 40% |
| 240 | <0.01 | 1.65 | 67% |

In a third set of tests, results were determined for differing amounts of Mg (from 20 to 60 mg/kg) and excess NaOH (from 0.05 to 0.2 g/L) added. Here, a constant temperature of 60° C. and a constant residence time of 120 minutes were used. Table 3 again shows the residual amounts of Al and $SiO_2$ in mg/kg determined.

TABLE 3

Different Mg and NaOH addition

| Excess NaOH (g/L) | Mg added (mg/kg) | Final Al (mg/kg) | Final $SiO_2$ (mg/kg) | $SiO_2$ removed (%) |
|---|---|---|---|---|
| 0.05 | 20 | 0.01 | 3.15 | 37% |
| 0.1 | 20 | 0.01 | 3.80 | 24% |
| 0.2 | 20 | 0.01 | 4.35 | 13% |
| 0.05 | 40 | <0.01 | 2.75 | 45% |
| 0.1 | 40 | 0.01 | 3.25 | 35% |
| 0.2 | 40 | <0.01 | 3.70 | 26% |
| 0.05 | 60 | <0.01 | 2.35 | 53% |
| 0.1 | 60 | <0.01 | 2.80 | 44% |
| 0.2 | 60 | <0.01 | 3.65 | 27% |

Exemplary results when using a two side stream process as depicted in FIG. 2 were determined in a fourth set of tests. In each test here, two samples of test brine were treated separately. A common temperature of 60° C. and a common 0.1 g/L excess NaOH were used in both cases. (In this set of tests, the excess NaOH was added to both samples before the Mg was added.) The first of the two samples however was treated as might be done in the first side stream line while the second sample was treated as might be done in the second side stream line. Here then, either 40 or 60 mg/kg of Mg was added (as indicated below) to the first sample, which was then allowed to react over a residence time of 120 minutes. After this residence period ended, 2 mg/kg of Mg was added to the second sample. Varied amounts of the two samples (either 1:1 or 2:1 by volume for the first sample:second sample) were then mixed together immediately, were filtered as above, and analysed for aluminum and silica content as above. Table 4 shows the residual amounts of Al and $SiO_2$ in mg/kg determined for this set of tests.

TABLE 4

Results for two side streams

| Mg added to 1st sample (mg/kg) | Volume ratio first:second sample | Final Al (mg/kg) | Final $SiO_2$ (mg/kg) | $SiO_2$ removed (%) |
|---|---|---|---|---|
| 40 | 1:1 | <0.01 | 3.55 | 29% |
| 60 | 2:1 | <0.01 | 3.10 | 37% |

The above series of tests demonstrates that the method is expected to be effective in removing aluminum and silica species from typical brines. Over the temperatures tested, silica removal was noticeably improved at higher temperatures while aluminum was always removed and thus not affected. Further, silica removal increased with longer residence time while aluminum again was always removed. Further still, the greater the amount of added Mg, the greater the amount of silica removed, again with no noticeable effect on aluminum removed. And it appears that removal of aluminum and silica is practical using a two side stream line process, without overly compromising removal efficiency significantly.

In a further illustrative test, silica removal was attempted on a brine sample without providing excess NaOH during the residence period. Specifically, 40 mg/kg Mg was added to a test brine sample at a temperature of 60° C. and allowed to react over a residence time of 120 minutes without adding excess NaOH during the residence period. At the end of the residence period, 0.1 g/L NaOH was added but after mixing, the sample was filtered and analysed as above. Only 6% of the silica was removed in this example, indicating that excess NaOH is required during the residence period for this process to be effective.

All of the above U.S. patents, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

The invention claimed is:

1. An electrolysis system for electrolyzing an alkali metal chloride brine, the system comprising:
an electrolyzer having an inlet and an outlet;

a main line comprising a main stream of purified brine, the electrolyzer, and a main stream of spent solution wherein the main stream of purified brine is supplied to the inlet of the electrolyzer and the main stream of spent solution is removed from the outlet of the electrolyzer;

a recirculation line connected to the main line that recirculates at least a portion of the solution from the main line; and a side stream subsystem comprising:

a first side stream line with an inlet and an outlet connected to the recirculation line and configured to remove a portion of the solution from the recirculation line at the inlet and return the portion to the recirculation line at the outlet;

a feed for introducing alkali metal hydroxide into the first side stream line;

a first feed for introducing magnesium chloride into the first side stream line;

a residence tank in the first side stream line downstream of the alkali metal hydroxide and the magnesium chloride feeds; and a filter in the first side stream line downstream of the residence tank for removing precipitated impurity species;

and wherein the first magnesium chloride feed is located downstream of the alkali metal hydroxide feed in the first side stream line and the side stream subsystem comprises:

a second side stream line having an inlet and an outlet, wherein the inlet of the second side stream line is connected to the first side stream line between the alkali metal hydroxide feed and the first magnesium chloride feed, and the outlet of the second side stream line is connected to the first side stream line between the residence tank and the filter, whereby the second side stream line bypasses the residence tank; and a second feed for introducing magnesium chloride into the second side stream line.

2. The electrolysis system of claim 1 wherein the alkali metal of the alkali metal chloride brine is sodium.

3. The electrolysis system of claim 1 wherein the side stream subsystem comprises a mixing tank between the residence tank and the filter and the outlet of the second side stream line is connected to the mixing tank.

4. The electrolysis system of claim 1 wherein the side stream subsystem comprises a static mixer downstream of each of the alkali metal hydroxide, the first magnesium chloride, and the second magnesium chloride feeds.

5. The electrolysis system of claim 1 wherein the electrolysis system is a chlor-alkali electrolysis system, the electrolyzer is a chlor-alkali electrolyzer, and the recirculation line is the main line and recirculates the solution in the main line from the outlet to the inlet of the chlor-alkali electrolyzer.

6. The electrolysis system of claim 5 comprising:
at least one purification subsystem in the recirculation line for purifying the solution; and
at least one make-up subsystem in the recirculation line for introducing additional alkali metal chloride and water into the solution.

7. The electrolysis system of claim 5 wherein the first side stream line is configured to remove less than about 50% of the solution in the recirculation line.

8. The electrolysis system of claim 7 wherein the first side stream line is configured to remove more than about 5% of the solution in the recirculation line.

9. The electrolysis system of claim 5 wherein the side stream subsystem comprises at least one static mixer downstream of the alkali metal hydroxide and the first magnesium chloride feeds.

10. The electrolysis system of claim 5 wherein the alkali metal hydroxide and the first magnesium chloride feeds are introduced into the first side stream line at the same location.

11. The electrolysis system of claim 1 wherein:
the electrolysis system is a chlorate electrolysis system;
the electrolyzer is a chlorate electrolyzer;
the system comprises:
a chlorate reactor in the main line to further react electrolyzed chlorate solution from the chlorate electrolyzer to more concentrated chlorate solution; and
a chlorate crystallization subsystem in the main line downstream of the chlorate reactor for crystallizing chlorate from the more concentrated chlorate solution; and
the recirculation line recirculates chlorate solution from the crystallization subsystem to the chlorate reactor.

* * * * *